July 5, 1938.    A. J. LIPPOLD    2,122,866
FLOAT VALVE
Original Filed Feb. 23, 1935
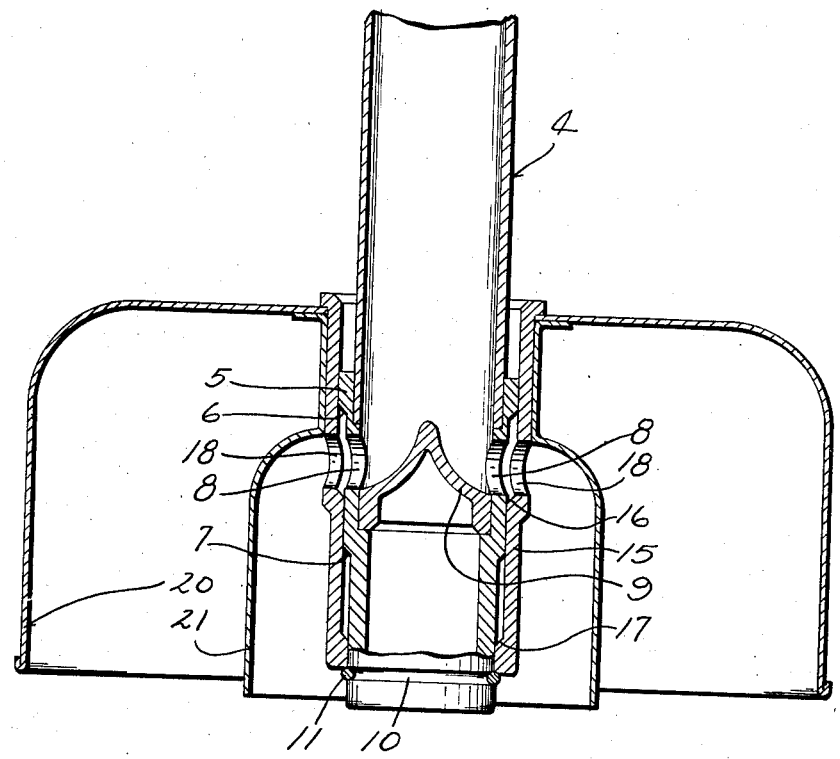
INVENTOR
Joseph J. Lippold
BY
Wheeler, Wheeler & Wheeler
ATTORNEYS Patented July 5, 1938

2,122,866

UNITED STATES PATENT OFFICE 2,122,866

FLOAT VALVE

Adolph J. Lippold, Milwaukee, Wis., assignor to Cherry-Burrell Corporation, Chicago, Ill., a corporation Original application February 23, 1935, Serial No. 7,742. Divided and this application July 11, 1936, Serial No. 90,101

6 Claims. (Cl. 137—104)

This invention pertains to float valves. The present application is a division of my application Serial Number 7,742, entitled Bottle filling mechanism and filed February 23, 1935.

One of the objects of the invention is to provide a float valve in which a bell surrounding the valve ports or encircling the supply tube serves as a float, the valve comprising a sleeve connected with said bell to be moved upwardly by the buoyancy of air trapped in the bell and to be moved downwardly by gravity.

It is a further object of the invention to provide a novel and improved valve structure in which a slide valve is provided with two seats simultaneously engageable at each side of the supply port in the closed position of the valve, whereby flow is positively cut off without requiring that the parts fit so tightly as to make the operation uncertain.

The drawing shows a view in axial section through a valve embodying this invention.

The supply tube 4 is provided at its lower end with a fitting 5 which provides two correspondingly beveled seats at 6 and 7 respectively, and has apertures 8 between said seats for the control discharge of material supplied through pipe 4.

Engaged upon an interior shoulder in the fitting 5 is the closure 9 which is preferably so shaped as to direct the supplied material through the ports 8. Near its lower end the fitting 5 has an annular exterior peripheral groove at 10 in which a spring wire 11 is engaged to function as a stop.

Co-acting with the fitting 5 is the valve sleeve 15 which slides externally in a vertical direction upon fitting 5 and has seats at 16 and 17 complementary to the seats 6 and 7. Above the seats 16 the valve sleeve 15 is provided with escape ports 18 which, in the open position of the valve as shown in the drawing, may register with the ports 8. It will, however, be noted that the ported portions of fitting 5 and sleeve 15 are spaced apart at a distance equivalent to the depth of the valve seats 6 and 16, respectively. The annular space thus provided between the sleeve and the fitting provides communication between ports 8 and 18 even if the sleeve is annularly rotated so that the ports are out of registry.

By way of a float the sleeve 15 preferably carries a bell 20 in which air is trapped when the lower margin of the bell is immersed in a container in which liquid is to be kept at a constant level. In the companion application above referred to, I have shown the invention used in bottle filling apparatus wherein the valve serves to maintain milk at a constant level in a supply chamber from which the bottles are filled. This is just one service to which the invention may be put, and for use with milk, it is noteworthy that the construction disclosed is such that by simply removing the retaining ring or stop 11, the parts may readily be disassembled and rather completely exposed for cleaning.

In this particular construction, the organization is compact and the liquid is entering the chamber at substantially the same level as the bell. Since the bell encloses or surrounds the ports 8 and 18, it will be obvious that the liquid entering through these ports might entrain or absorb the air in the bell to change its level of flotation if the discharge were permitted to occur freely through the ports into the area of the bell. To avoid this, I prefer to provide the annular baffle 21 which is connected with the sleeve 15 and closely spaced adjacent to the sleeve and well within the periphery of bell 20 to guide downwardly the effluent from ports 18 without permitting such effluent to spray throughout the interior of the bell.

I claim:

1. In a valve, the combination with a supply pipe provided with means closing the pipe at its end, said pipe having a lateral opening and a series of at least three external substantially cylindrical bearing surfaces of differential diameters progressively reducing toward the closed end of the pipe, of a sleeve valve having differentially diametered bearing portions complementary to the bearing surfaces of the pipe and in sliding contact thereon, said valve being ported to afford communication through the opening of said pipe with the interior thereof when said valve is open, a float carried by said sleeve valve for unitary movement therewith and to receive guidance from said pipe, and releasable means for securing said valve against removal from said pipe, said valve and float being unitarily freely removable from said pipe on release of said means.

2. The combination with a pipe provided with a closed end and with means providing a series of three external bearing surfaces of substantially cylindrical form and differential diameters progressively decreasing toward the closed end of the pipe, said means being apertured through an intermediate portion of the central bearing surface, said means also providing valve seat shoulders between the central bearing surface and the other bearing surfaces, both of said shoulders being spaced from the aperture in the central bearing surface, of a valve sleeve having interior bearing surfaces complementary to those of said means and in sliding bearing engagement therewith, said sleeve also having valve seat shoulders complementary to the shoulders of said means and engageable therewith at one extreme position of movement of said sleeve respecting said pipe, the largest diametered bearing surface of said sleeve being provided with an aperture adapted to afford communication through said first mentioned aperture to said pipe when said sleeve is displaced substantially from said position, and means for releasably limiting the movement of said sleeve on said pipe, said sleeve being freely removable from said pipe upon release of said last mentioned means.

3. In a device of the character described, the combination with a suspended pipe, of an internally shouldered fitting mounted at the lower end of the pipe and provided with a lateral opening above the shoulder, a closure seated on the shoulder and including means for deflecting flow from said pipe through the aperture, a series of substantially cylindrical bearing surfaces on the exterior of said fitting progressively decreasing in diameter to and beyond said closure, there being at least three such surfaces and said aperture being disposed intermediate the ends of the second largest surface, tapered valve seat shoulders between the successive bearing surfaces, a valve sleeve having interior bearing surfaces and intervening valve seat shoulders complementary to those of a fitting and provided with an aperture in its bearing surface of largest diameter, the second largest interior bearing surface of the sleeve being adapted to maintain said ports substantially closed against communication after initial separation of the shoulders of the sleeve and fitting respectively, and means operatively connected with said sleeve for displacement thereof sufficiently to afford communication between said apertures and the interior of said fitting.

4. In a device of the character described, the combination with a suspended pipe, of an internally shouldered fitting mounted at the lower end of the pipe and provided with a lateral opening above the shoulder, a closure seated on the shoulder and including means for deflecting flow from said pipe through the aperture, a series of substantially cylindrical bearing surfaces on the exterior of said fitting progressively decreasing in diameter to and beyond said closure, there being at least three such surfaces and said aperture being disposed intermediate the ends of the second largest surface, tapered valve seat shoulders between the successive bearing surfaces, a valve sleeve having interior bearing surfaces and intervening valve seat shoulders complementary to those of a fitting and provided with an aperture in its bearing surface of largest diameter, the second largest interior bearing surface of the sleeve being adapted to maintain said ports substantially closed against communication after initial separation of the shoulders of the sleeve and fitting respectively, means operatively connected with said sleeve for displacement thereof sufficiently to afford communication between said apertures and the interior of said fitting, said fitting and sleeve having interengageable means releasably limiting relative movement therebetween in the direction in which the bearing portions of said fitting reduce in diameter, said sleeve being freely removable from said fitting upon release of said last mentioned means.

5. In a device of the character described, the combination with a supply pipe having first, second, and third bearing surfaces of progressively increasing diameter and shoulders between surfaces constituting annular seats, said pipe having a port in the second of said surfaces, of a valve sleeve having complementary seats and first, second, and third portions with surfaces complementary to and slidable upon the surfaces of the supply pipe, said sleeve being ported in its third portion, and float means having an annular top surrounding and connected with said third sleeve portion for the actuation of said sleeve, said float means being protected by the bearing engagement of said third sleeve portion upon the third bearing surface of the pipe from overflow across said top.

6. In a device of the character described, the combination with a supply pipe having first, second, and third bearing surfaces of progressively increasing diameter and shoulders between said surfaces constituting annular seats, said pipe being ported in the second of said surfaces, of a valve sleeve having complementary seats and first, second, and third bearing portions with bearing surfaces complementary to and slidable upon the surfaces of the supply pipe, said sleeve being ported in its third portion, a float comprising an inverted cup surrounding said sleeve and connected to said third bearing portion above the port therein and protected by said third bearing surface against over-run of liquid from said pipe, and a baffle within the cup opening downwardly from a point above the port of said sleeve.

ADOLPH J. LIPPOLD.